W. F. WALSH.
GLOBE VALVE.
APPLICATION FILED APR. 16, 1920.
1,364,848.
Patented Jan. 4, 1921.
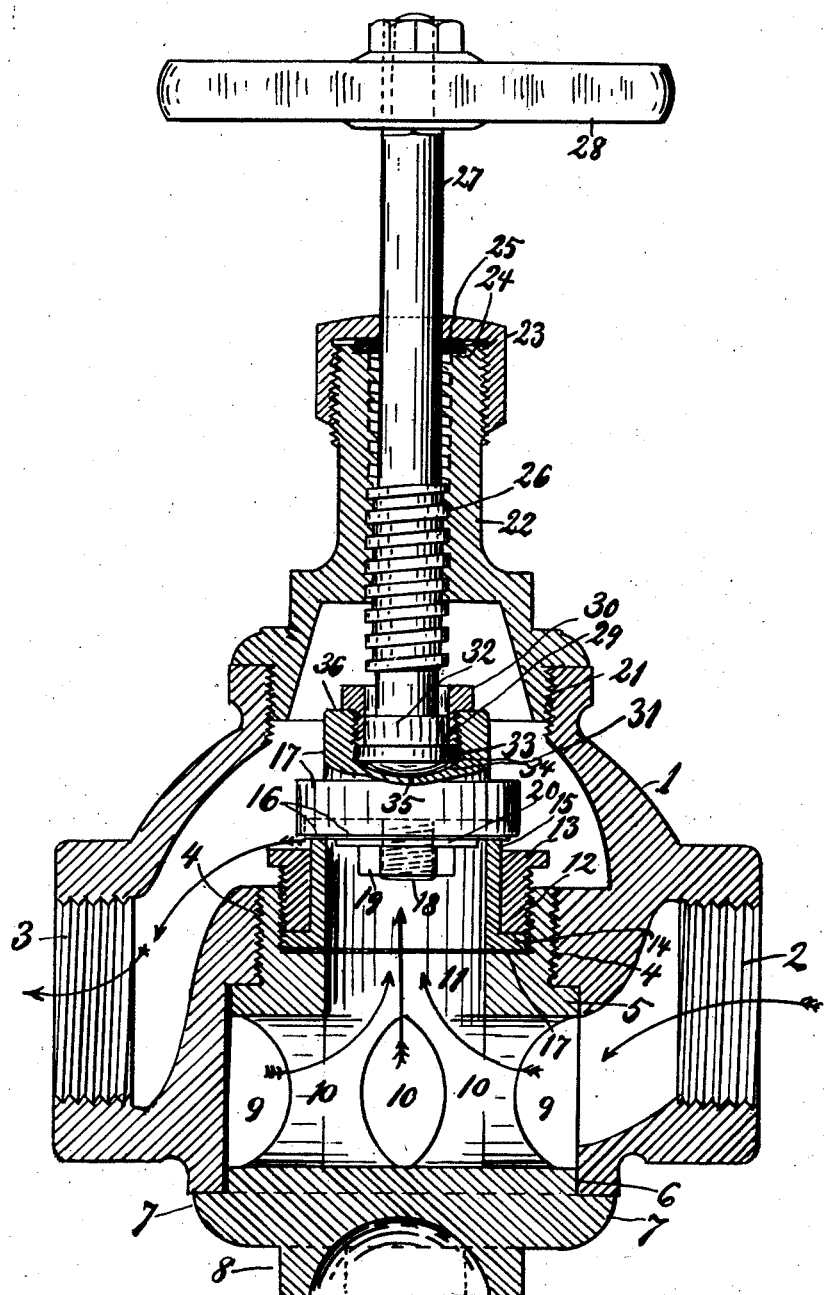
INVENTOR:
William F. Walsh.
BY his ATTORNEY:
A. M. Carlsen.

UNITED STATES PATENT OFFICE.

WILLIAM F. WALSH, OF ST. PAUL, MINNESOTA.

GLOBE-VALVE.

1,364,848.  Specification of Letters Patent.  Patented Jan. 4, 1921.

Application filed April 16, 1920. Serial No. 374,488.

*To all whom it may concern:*

Be it known that I, WILLIAM F. WALSH, a citizen of the United States, residing at St. Paul, in the county of Ramsey and State of Minnesota, have invented new and useful Globe-Valves, of which the following is a specification.

This invention relates to improvements in globe-valves, and the object is to further improve upon the structure disclosed in my Letters Patent No. 1,326,430 issued by the United States Patent Office on the 30th day of December 1919.

The accompanying drawing is a substantially central longitudinal vertical section of the improved valve, only the valve stem or screw, its handle and a portion of the element 17 is intact.

Referring to the drawing by reference numerals, 1 designates the valve shell; which is provided with threads 2 for an intake pipe and threads 3 for an outlet pipe. The arrows indicate the direction in which water, oil, gas, compressed air, etc., are supposed to move through the valve.

Screw-threaded at 4 in the shell is an upwardly inserted base plug 5, which fits snugly into and closes the lower opening 6 of the shell, the flange 7 being drawn tight to the shell by the threads 4 when a wrench is applied to the hollow hexagon bottom projection 8.

Said base plug 5 is formed with a peripheral groove 9, from which extends several radial ducts 10 into a vertical cylindrical duct 11, the upper portion of which is enlarged and provided with internal screw threads 12 for a threaded collar 13. This collar 13 presses upon the external flange 14 of a removable valve seat 15. 17 is a packing of paper or cloth or similar thin material to make a tight joint.

The seat 15 is closed by a soft washer 16 which is partly inserted in a recess in the bottom of a thimble 17, having a threaded stem 18 with a nut 19 and washer 20 for holding said packing 16 in place. Threaded at 21 in the top of the shell is the usual bonnet 22 which is provided with a packing gland 23 and a suitable recess 24 for packing 25. In said bonnet is threaded at 26 a valve stem 27 having a handle wheel 28. The lower end of the stem is very loosely passed through an externally threaded collar 29 having a hexagon, or octagon top portion 30 by which to screw it down into the threaded top cavity 31 of the thimble 17. Farther down the stem is enlarged some at 32, and still farther down it is formed with a collar 33 projecting in under the collar 29. The latter collar is integral and large enough to be slipped up and down over the threads 26 of the stem. The very bottom end of the screw is bulged downward at 34 into a bulging bottom 35 in the thimble. The retaining collar 29—30 is screwed tight at 36 but not tight enough down upon the collar 33 to prevent the thimble from wiggling some and thus readily adjust its packing 16 down upon the seat 15.

Whenever the packing 16 needs repair, the bonnet 22 is screwed off, the nut 19 removed, a new packing 16 substituted for the old one and the parts assembled again. And if the thimble 17 or its collar 29 needs repair they are easily separated, and if the collar 29 is to be removed, the screw or stem is detached from the handle wheel and moved downward until it is out of the collar 29. And if the valve seat 15 is to be repaired or replaced by a new one, it can readily be removed and replaced by first removing the collar 13.

Having thus described the construction and the advantages of same

What I claim is:

1. In a globe valve, the combination with a valve shell having an opening in its bottom, of a base plug fitting in said opening and having within said shell a peripheral groove and a vertical central passage with radial passages extending from it into the peripheral groove; said base plug having its upper end reduced and threaded into the shell, and formed also with an enlargement of the central duct, a tubular valve seat placed in said enlargement and having its lower end formed with an external flange and a collar threaded into the enlargement and bearing upon said flange, the valve seat projecting slightly above the collar.

2. The structure specified in claim 1, and a thin packing underneath the flange of the valve seat.

In testimony whereof I affix my signature.

WILLIAM F. WALSH.